Aug. 23, 1932.  R. G. THOMPSON ET AL  1,873,510
TYPEWRITING MACHINE
Filed Sept. 12, 1931  3 Sheets-Sheet 1

INVENTORS
RUSSELL G. THOMPSON AND
CHESTER W. CRUMRINE
BY Harold E. Stonebraker
ATTORNEY Aug. 23, 1932.  R. G. THOMPSON ET AL  1,873,510
TYPEWRITING MACHINE
Filed Sept. 12, 1931   3 Sheets-Sheet 2
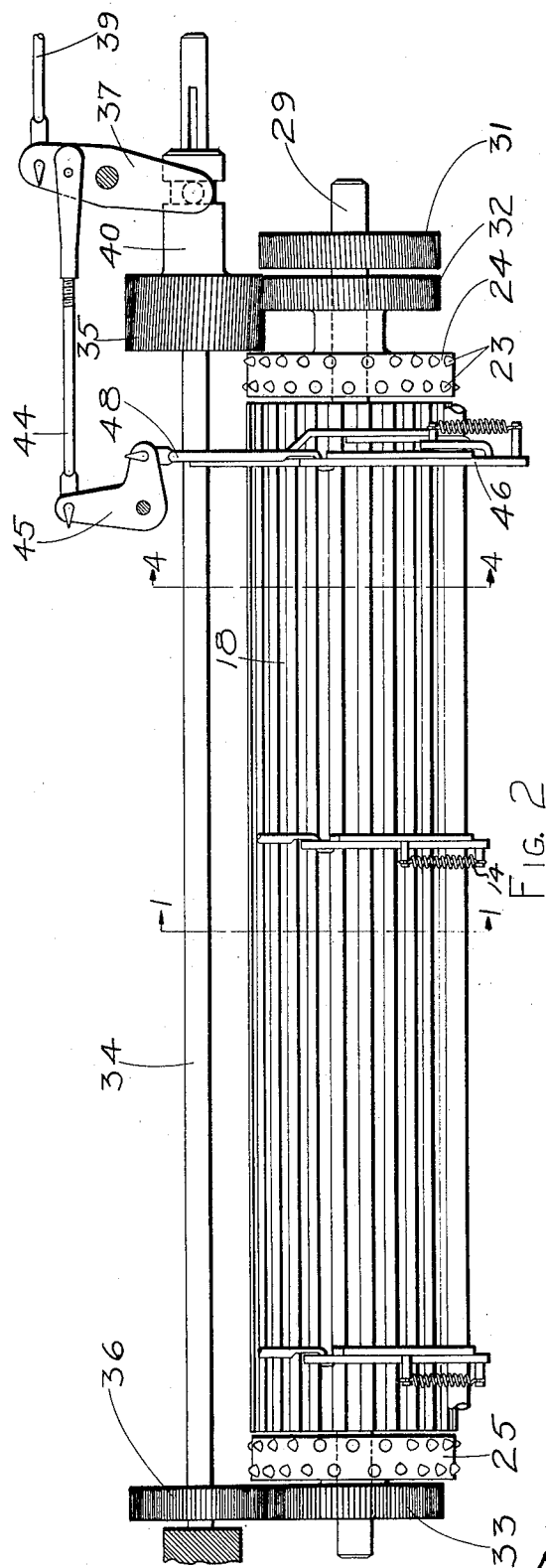
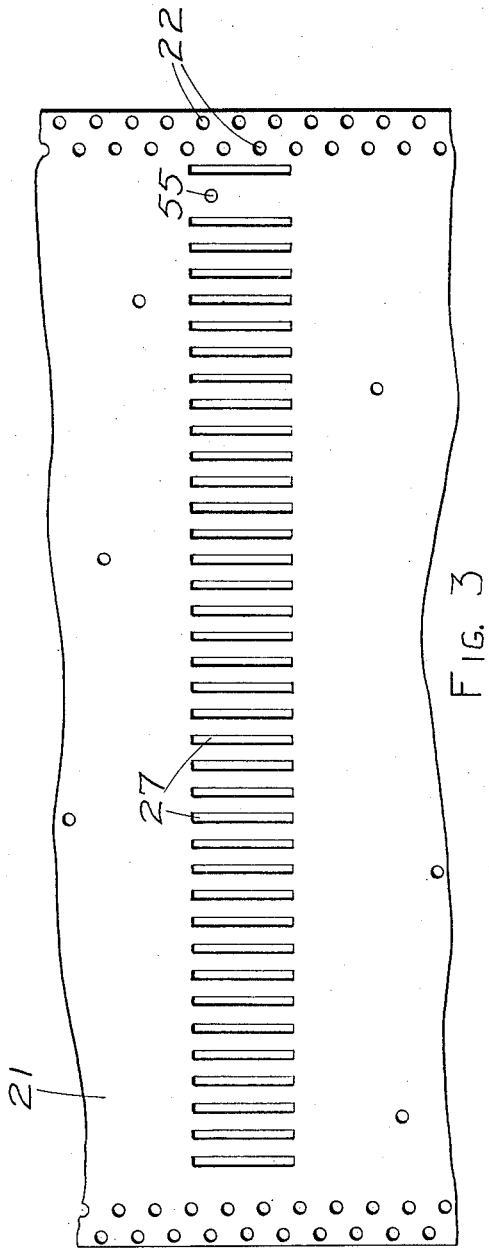
INVENTORS
RUSSELL G. THOMPSON AND
CHESTER W. CRUMRINE
BY Harold E. Stonebraker,
ATTORNEY Aug. 23, 1932.  R. G. THOMPSON ET AL  1,873,510
TYPEWRITING MACHINE
Filed Sept. 12, 1931    3 Sheets-Sheet 3

INVENTORS
RUSSELL G THOMPSON AND
BY CHESTER W. CRUMRINE
Harold E. Stonebraker
ATTORNEY Patented Aug. 23, 1932

1,873,510

UNITED STATES PATENT OFFICE

RUSSELL G. THOMPSON AND CHESTER W. CRUMRINE, OF ROCHESTER, NEW YORK, ASSIGNORS TO ELECTROMATIC TYPEWRITERS, INC., OF ROCHESTER, NEW YORK, A CORPORATION OF NEW YORK

TYPEWRITING MACHINE

Application filed September 12, 1931. Serial No. 562,520.

This invention relates to improvements in typewriting machines, and particularly to power operated typewriting machines in which the operation of the type bars may be automatically controlled by means of a master sheet, or manually from the keyboard in the usual manner.

The principal object of the invention is the provision of simple and convenient means for quickly converting a power driven typewriting machine from a manually controlled machine to a master sheet controlled machine, or vice versa.

Another object of the invention is the provision of a machine of this kind having a minimum number of parts and in which the parts cooperating with the power driven roller may be controlled either manually by the key levers or automatically by means of a perforated master sheet.

Still another object of the invention is the provision of a machine of this kind having a power driven roller and means cooperating with said roller for actuating the typewriting devices, the interengagement of said cooperating means with the roller being controlled by a master sheet on the roller or manually by the key levers.

A further object of the invention is the provision of a power driven typewriting machine having a power driven roller, and means movable into engagement therewith for actuating the printing instrumentalities, the movement of said means into engagement with said roller being selectively controlled by a master sheet on the roller and movable with the roller, means being provided for stopping the movement of the sheet independently of the roller while the engagement of said means with the roller is selectively controlled by the manual operation of the key levers.

A still further object of the invention is the provision of means for automatically releasing the pressure of the star wheels on the master sheet to render them inoperative at a predetermined point in advance of the operation of devices for automatically disconnecting the sheet feeding devices from their driving means.

To these and other ends, the invention consists in the construction and arrangement of parts that will appear from the following description when read in conjunction with the accompanying drawings, the novel features being pointed out in the claims at the end of the specification.

In the drawings:

Fig. 2 is a plan view of the power driven roller and sheet feeding devices;

Fig. 3 is a fragmentary view of a portion of the master sheet;

Figure 1:
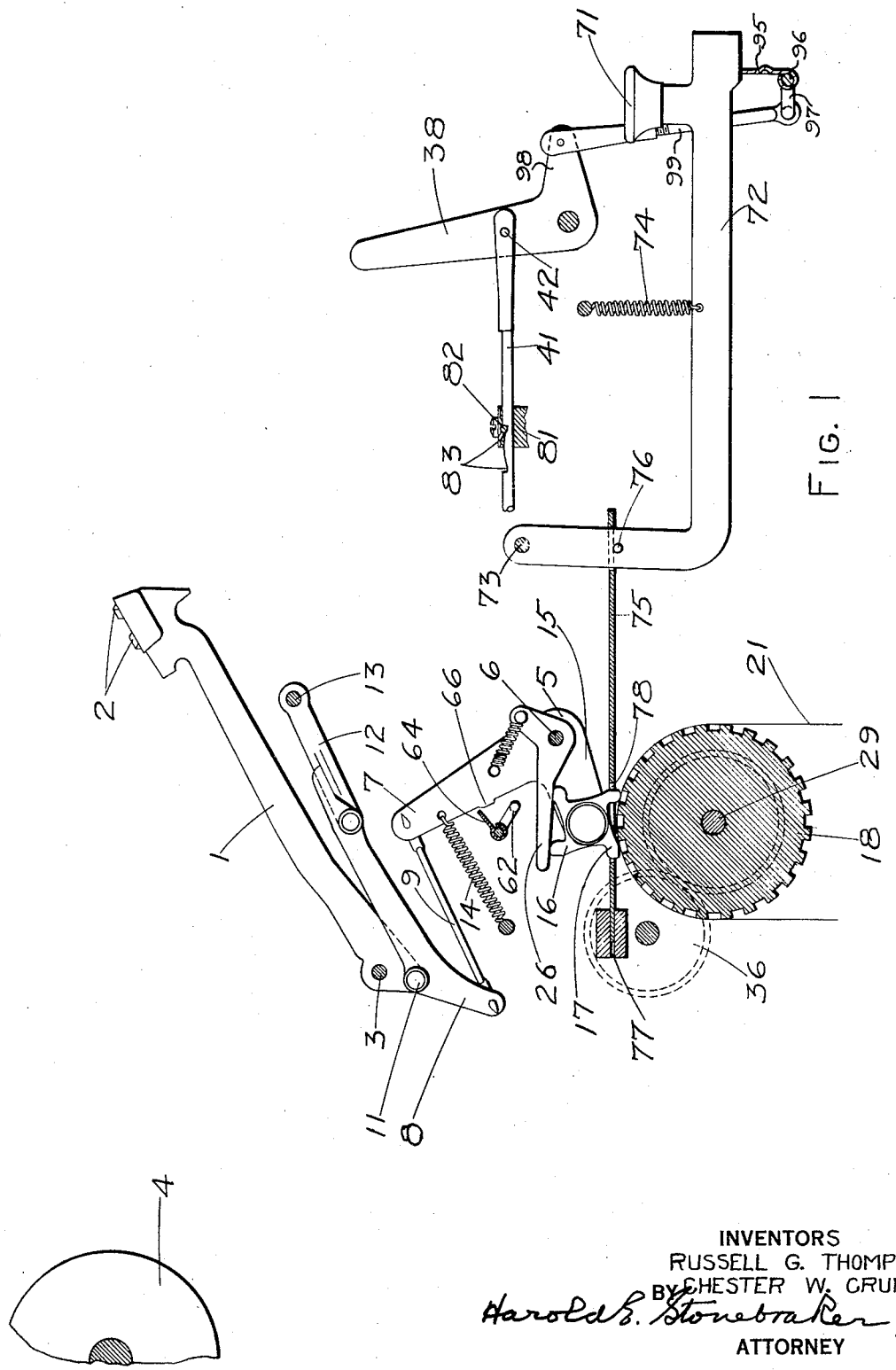
Fig. 1 is a transverse sectional view showing only so much of a typewriting machine as is necessary to illustrate one possible embodiment of the invention, the section through the power roller being taken substantially on line 1—1 of Fig. 2.
Figure 4:
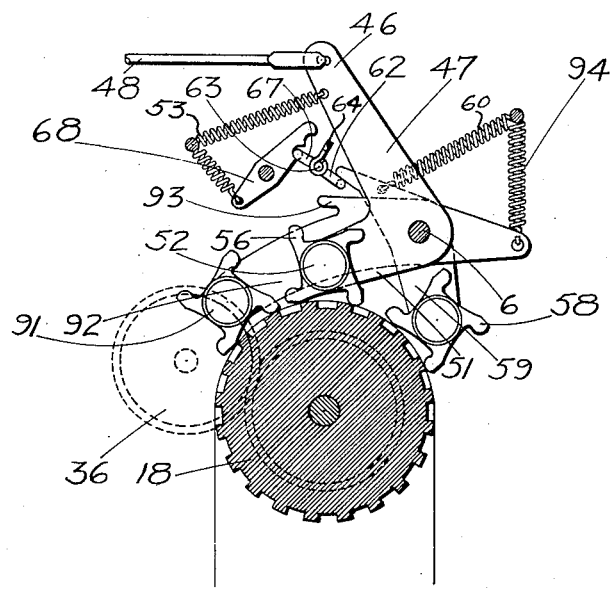
Fig. 4 is a transverse section through the power driven roller, the section being taken substantially on line 4—4 of Fig. 2, looking in the direction of the arrows at said line.
Figure 5:
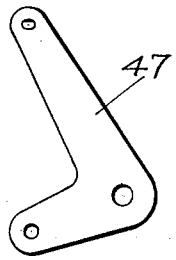
Fig. 5 is a side elevation of a bell crank lever on which a star wheel is mounted which controls the operation of the sheet feeding means.
Figure 7:
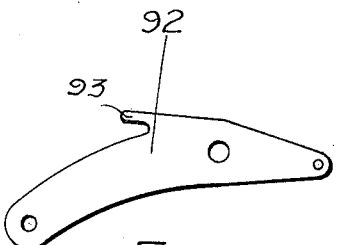
Fig. 7 is a similar view of a lever which is operable to reengage the star wheels with the master sheet.
Figure 6:
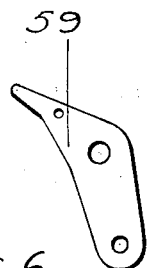
Fig. 6 is a similar view of a lever for releasing the star wheels from the master sheet.

Referring particularly to the drawings, in which like reference numerals refer to the same part in all the figures of the drawings, 1 is a type bar having types 2, and pivoted on the common pivot rod 3. Means are provided for swinging the type bar to move its type into printing engagement with a platen 4. It will be understood that the usual printing instrumentalities are or may be provided, although but a single type bar is illustrated herein for the sake of clearness.

The type bars are actuated by means of bell crank levers 5 pivoted on a common pivot rod 6 and each having an upwardly extending arm 7 connected with an arm of a toggle lever 8 by means of a link 9. The toggle lever 8 is pivoted to the type bar at 11 and has an arm pivoted to the free end of a toggle link 12 pivoted on a fixed part at 13. When the bell crank 5 is actuated to swing its arm 7 forwardly, it swings the lever 8 in a direction to break the toggle and swing the type bar into engagement with the platen. A spring 14 connects the arm 7 with a fixed part and resiliently returns the parts to normal position.

Power driven devices are provided for actuating the bell crank lever 5. To this end, the bell crank has a rearwardly and downwardly projecting arm 15 on the free end of which an actuator in the form of a star wheel 16 is revolubly mounted. The star wheel is provided with a plurality of arms or rays 17, four in the embodiment illustrated, although a greater or lesser number may be employed without departing from the spirit of the invention. The star wheel is arranged near or adjacent the surface of a power driven roller 18 having alternate projections and depressions on its surface with which the arms of the star wheel are adapted to engage. When an arm of the star wheel engages one of the depressions in the power driven roller, the star wheel is rotated and cams its pivot away from the roller to swing the bell crank 5 and actuate its type bar into engagement with the platen. From an inspection of Fig. 1 of the drawings, it will be noted that the spring 14 operates to press the star wheel into engagement with the power driven roller.

Both manual and master sheet controlled means are provided for controlling the engagement of the arms of the star wheel with the depressions in the surface of the power driven roller. The master sheet 21 is provided with perforations 22 along its lateral margins whereby it is positively engaged by projections 23 on rings or wheels arranged at the ends of the power driven roller 18. The wheels 24 and 25 are rotated in unison and insure even forward movement of both side edges of the master sheet, thus insuring correct alinement between the arms of the star wheels and the perforations in the sheet. The spring 14 operates to press two adjacent arms of the star wheel into engagement with the master sheet, as seen in Fig. 1, and when the forward arm meets a perforation in the sheet, it projects therethrough into engagement with the roller and the star wheel is rotated thereby to actuate the associated type bar.

It is frequently desirable, as when writing circular letters, set forms or other matter provided on a master sheet, to stop the operation of the master sheet temporarily while the addressee's name or blanks in the form are written by manually controlled means, as by the usual keys. To this end, means are provided for releasing the tension of the springs 14 from the star wheels so that they are inoperative to engage it with the power roller and disconnecting the wheels 24 and 25 from their driving means. A spring-pressed arm 26 engages the opposite pair of arms 17 and frictionally and resiliently retains the star wheel in normal position. At those points in the writing on the master sheet where it is desired to control the writing manually, the master sheet is provided with elongated slots 27, one corresponding to each of the star wheels 16 which control the printing instrumentalities. If now the movement of the sheet be stopped when the slots 27 register with the star wheels, the latter are free to move into and out of engagement with the power driven roller and turn on the bell crank levers 5 while projecting through the slots 27.

The shaft 29 to which the roller is fixed is operatively connected with a suitable source of power, such as an electric motor, and has a pinion or gear 31 fixed thereto adjacent one end thereof. The rings or wheels 24 and 25 are revolubly mounted on the shaft 29 adjacent the opposite ends of the roller 18 and have gears 32 and 33 fixed thereto, whereby they may be rotated in unison with the roller 18, or the roller may be rotated independently of the rings 24 and 25, during which time its shaft turns freely in the hubs of the gears 32 and 33.

Means are provided for operatively connecting the gears 32 and 33 with the gear 31 to be driven thereby in unison with the shaft 29. To this end, a shaft 34 is revolubly mounted in the frame with its axis substantially parallel with the shaft 29. Mounted on the shaft 34 are pinions 35 and 36 operatively engaging the gears 32 and 33 respectively. The gears 35 and 36 are fixed to the shaft 34 to rotate therewith, but the gear 35 is splined on the shaft so that it is axially movable thereon to and from operative engagement with the gear 31. The gear 35 has its face sufficiently wide to engage the gears 31 and 32 simultaneously. When the gear or pinion 35 is in the position shown in Fig. 2 of the drawings, it is out of engagement with the gear 31 and is not rotated thereby so that at this time the gears 35 and 36 and the wheels 24 and 25 operatively connected therewith are motionless, as is also the perforated sheet which is driven thereby. When, however, the gear 35 is moved axially into mesh with the gear 31 which rotates with the shaft 29, the gear 35 is rotated to turn the gear 32 and with it the shaft 34, pinion 36 and gear 33. The wheels 24 and 25 are also rotated to feed the master sheet. The gears 31, 32, 33, 35 and 36 are all provided with the same number of teeth so that they all rotate at the same speed in unison.

As shown in Fig. 1, the parts are set for master sheet control while Fig. 2 shows the parts set for manual or key control. When the parts are set for key control, it is necessary to release the pressure of the star wheels on the master sheet to render them inoperable thereby and to stop the feeding movement of the master sheet with its slots 27 in registration with the star wheels. Inasmuch as the master sheet is hidden from view of the operator, it is desirable to provide means controlled by the master sheet for releasing the pressure of the star wheels thereon and also for disconnecting the sheet feeding devices 24 and 25 from their driving means so timed that these operations take place at the time when the master sheet is in position to permit the star wheels to be projected through its slots to engage the power roller. The gear 35 has a hub 40 secured to or formed integral therewith, which is provided with a circumferential groove which is operatively engaged by a trunnion on a lever 37. The arrangement is such that the hub turns freely relatively to the lever, but when the lever is turned on its pivot, it operates to slide the gear 35 on its shaft to and from operative engagement with the gear 31. The lever 37 is operatively connected with a hand operated lever 38 by means of the links 39 and 41. The lever 38 is pivoted on a fixed part of the frame convenient to the keyboard. When the parts are adjusted for master sheet control, as seen in Fig. 1 of the drawings, movement of the lever 38 is operative to actuate the lever 37 to connect the sheet feeding means with its driving means. Means controlled by the master sheet are provided for actuating the lever 37 to automatically disconnect the sheet feeding means from its driving means. To this end, a link 44 connects the lever 37 with one arm of a bell crank lever 45 pivoted on a fixed part of the machine and having its other arm connected with an arm 46 of a bell crank lever 47 by means of the link 48. The bell crank 47 is pivoted on the common pivot rod 6, and its other arm 51 projects downwardly and rearwardly therefrom toward the power driven roller 18 and has a star wheel 52 revolubly mounted thereon. The star wheel 52 is arranged in axial alinement with the star wheels 16 and is lightly pressed into engagement with the master sheet by means of a spring 53. The star wheel 52 is arranged in the path of an opening or perforation 55 in the master sheet arranged in transverse alinement with the slots 27 therein and intermediate their ends. When the opening 55 moves into alinement with an arm 56 of the star wheel or the forward one of the arms in contact with the master sheet, the spring 53 operates to press the arm through the sheet into engagement with the roller 18. The roller 18 turns the star wheel and cams the lever 51 away from the roller to pull the link 48 to swing the lever 37 and disconnect the sheet feeding devices from their driving means. It will be noted that the perforation 55 is so arranged that the star wheel 52 is actuated at the time when the slots 27 are in a position between the roller 18 and the star wheels 16.

As previously stated, means are provided for releasing the pressure of the star wheels 16 on the master sheet before the slots 27 reach a position between them and the roller 18. To this end, a star wheel 58 is revolubly mounted on an arm of a lever 59 mounted on the pivot rod 6 and arranged so that the star wheel 58 is arranged in the same vertical plane as the star wheel 52 and in the path of the perforation or opening 55 in the master sheet. The other arm of said lever 59 is arranged to engage an arm 62 projecting from a shaft 63 pivoted in the frame. The shaft 63 has a locking bar 64 fixed thereto which occupies an ineffective position when the machine is set for master sheet control, as seen in Fig 1 of the drawings. When the perforation 55 of the master sheet moves into registration with an arm of the star wheel 58, the arm moves through the opening into engagement with the power roller to be actuated thereby. The star wheel 58 is resiliently engaged with the master sheet by means of the spring 60 which connects one arm of the lever 59 with a fixed part, and resiliently presses its other arm toward the power driven roller. When the star wheel 58 is turned by the power roller, it cams its arm of the lever away from the roller and swings the other arm of the lever into engagement with the arm 62 to swing it and with it the locking bar 64 into a position to simultaneously engage the lugs or projections 66 on the bell crank levers 7 and supports them against the tension of the springs 14 which press them toward the roller 18 or the master sheet thereon. The shaft 63 has an arm 67 with which a spring-pressed detent 68 cooperates to retain the locking bar in either operative or inoperative position. When it is desired to again control the machine automatically by the master sheet, the lever 38 is manually operated to actuate the lever 37 through the links 41 and 39 to again connect the driving means with the sheet feeding devices. The arrangement of the parts is such that the star wheel 58 is met by the perforation 55 to actuate the locking bar in advance of the operation of the star wheel 52 by said opening. When the sheet feeding means is again connected with its driving means to feed the master sheet, the locking bar 64 still engages the bell cranks 7 and prevents the star wheels 16 from falling through the slots 27 to be operated by the power driven roller.

When the levers 7 are engaged by the locking bar and the master sheet rests with its slots 27 alined with the star wheels 16, the machine may be operated manually by the usual keys 71 on the key levers 72 pivoted on the common pivot rod 73. Springs 74 connect the key levers with a fixed part and resiliently retain them normally in elevated position. Each of the key levers is operatively connected with one of the star wheels 16 by means of a slide 75 having an opening at its forward end whereby it may loosely engage the key lever supported on a lug or pin 76 projecting therefrom. At its rear end the slide slidably engages a slot 77 provided therefor in the frame of the machine. The slide is also provided with a slot 78 intermediate its ends through which the star wheel projects into engagement with the power roller. The arrangement is such that when the key lever is depressed, the slide 75 is moved into engagement with the star wheel 16 and turns it against the resiliency of the arm 26 into engagement with the roller 18 to be operated thereby. During such operation, the star wheel moves through its corresponding slot 27 in the master sheet. If desired, means may be provided for retaining the gear 35 in either sheet feeding or idle position. The link 41 moves in one direction when the master sheet feeding devices are thrown out of operation, and in the other direction when they are again thrown into operation. Retaining means are therefore provided which cooperate with the link 41. To this end, the link is guided in a slot or opening provided therefor in the frame member 81 into which a spring-pressed detent 82 projects into engagement with one or another of a pair of notches 83 formed on the link, one of said notches being in position to engage the detent when the link is in either of its operated positions. Said notches may be provided with inclined walls to automatically disengage the detent therefrom when the link is operated in one direction or the other.

When the lever 38 is operated to connect the sheet feeding means with its driving means to feed the master sheet, the bell cranks 5 are engaged by the locking bar 64 to release the pressure of the star wheels 16 from the master sheet so as not to be operative thereby. Means also controlled by the perforation 55 in the master sheet are provided for releasing the bar 64 from engagement with the bell cranks 7. To this end, a star wheel 91 is arranged in the same vertical plane as the star wheels 52 and 58 and engages the master sheet at a point to the rear of the star wheel 52 and in the path of the perforation 55. The star wheel 91 is pivoted on a lever 92 mounted on the common pivot rod 6 and has a projection 93 arranged to engage the arm 62 to swing the arm to turn the shaft 63 in a direction to release the bell crank levers 7 and permit them to again resiliently engage the star wheels 16 with the master sheet. It will be noted that the slots 27 have moved from between the star wheels 16 and the power roller when the star wheel 91 is operated to engage said star wheels with the master sheet. A spring 94 connects the lever 92 with a fixed part and resiliently presses the star wheel 91 against the master sheet.

Means are provided for locking the key levers 72 against operation when the machine is adjusted for master sheet control, as shown in Fig. 1, to prevent accidental operation thereof which might result in injury to the master sheet. The movement of said means to locking position may also be automatically controlled by the master sheet. Said means comprises a locking bar 95 arranged transversely of the key levers and beneath the same so as to be engageable with all of the key levers simultaneously, as shown in Fig. 1. The locking bar 95 is mounted on a rock shaft 96 mounted in the frame of the machine, which shaft is provided with a crank arm 97 whereby it may be rotated to move the locking bar to and from locking position. The free end of the arm 97 is connected with an arm 98 projecting forwardly from the lever 38 by means of the link 99. When the parts are in the Fig. 1 position, in which the locking bar engages the key levers and the operation of the machine is controlled by the master sheet, if the star wheel 52 is operated by meeting a perforation in the master sheet to stop the master sheet, the link 41 is operated to swing the lever 38 forwardly which rocks the shaft 96 through the link 99 and arm 97 in a counterclockwise direction to disengage the locking bar 95 from the key levers. When the lever 38 is manually operated in the reverse direction to connect the sheet feeding means with the power driven devices, the rock shaft 96 is turned in the reverse direction to move the locking bar to locking position.

Although only one embodiment of the invention is shown and described herein, it will be understood that this application is intended to cover such changes or modifications as come within the spirit of the invention or scope of the following claims.

We claim:

1. In a power driven typewriting machine, the combination of a continuously driven roller, printing instrumentalities, means on said roller for actuating said printing instrumentalities, a master sheet on said roller for selectively controlling the operation of said means, and disengageable means for feeding said master sheet.

2. In a power driven typewriting machine, the combination of a power driven roller, printing instrumentalities, means movable into engagement with said roller for actuating said printing instrumentalities, a master sheet on said roller for selectively controlling the operation of said means, master sheet feeding means, and means for automatically controlling the operation of said sheet feeding means.

3. In a power driven typewriting machine, the combination of a power driven roller, printing instrumentalites, means on said roller for actuating said printing instrumentalities, a master sheet on said roller for selectively controlling the operation of said means, master sheet feeding means concentric with said power driven roller, hand operated means for operatively connecting said sheet feeding means with the power driven roller to be operated in unison therewith, and automatically operable means for disconnecting the sheet feeding means from the power driven roller.

4. In a power driven typewriting machine, the combination of a power driven roller, printing instrumentalities, means on said roller for actuating said printing instrumentalities, a master sheet on said roller for selectively controlling the operation of said means, a shaft on which said power driven roller is mounted, means movable relatively to said shaft for feeding the master sheet, and means for operatively connecting said relatively movable means to said shaft to be driven thereby.

5. In a power driven typewriting machine, the combination of a power driven roller, printing instrumentalities, means on said roller for actuating said printing instrumentalities, a master sheet on said roller for selectively controlling the operation of said means, a shaft on which said power driven roller is mounted, means loosely mounted on said shaft for feeding the master sheet, a gear fixed to said shaft, and means movable into and out of engagement with said gear for operatively connecting said master sheet feeding means with said shaft.

6. In a power driven typewriting machine, the combination of a power driven roller, printing instrumentalities, means on said roller for actuating said printing instrumentalities, a master sheet on said roller for selectively controlling the operation of said means, a driven shaft on which said power driven roller is mounted, means loosely mounted on said shaft for feeding the master sheet, gears for turning said master sheet feeding means, a gear mounted on said driven shaft and driven thereby, and means for operatively connecting said first mentioned gears with said driven gear to feed the master sheet.

7. In a power driven typewriting machine, the combination of a power driven roller, printing instrumentalities, means on said roller for actuating said printing instrumentalities, a master sheet on said roller for selectively controlling the operation of said means, a driven shaft on which said power driven roller is mounted, means loosely mounted on said shaft for feeding the master sheet, a second shaft, means on the second shaft for driving said master sheet feeding means, and hand controlled means for operatively connecting said second shaft with said driven shaft.

8. In a power driven typewriting machine, the combination of a power driven roller, printing instrumentalities, means on said roller for actuating said printing instrumentalities, a master sheet on said roller for selectively controlling the operation of said means, a driven shaft on which said power driven roller is mounted, a wheel loosely mounted on said shaft for feeding the master sheet, and hand controlled means for operatively connecting said wheel with said driven shaft to feed the master sheet.

9. In a power driven typewriting machine, the combination of a power driven roller, printing instrumentalities, means on said roller for actuating said printing instrumentalities, a master sheet on said roller for selectively controlling the operation of said means, a driven shaft on which said power driven roller is mounted, a wheel loosely mounted on said shaft for feeding the master sheet, a second shaft operatively connected with said wheel, a gear fixed on the driven shaft, a second gear movable on the second shaft but revoluble therewith, and means for moving the second gear into and out of engagement with the first mentioned gear.

10. In a power driven typewriting machine, the combination of a power driven roller, printing instrumentalities, means movable into and out of cooperation with said roller for actuating said printing instrumentalities, a master sheet on said roller for selectively controlling the operation of said movable means, and key controlled means for independently controlling the operation of said movable means.

11. In a power driven typewriting machine, the combination of a power driven roller, printing instrumentalities, means movable into and out of cooperation with said roller for actuating said printing instrumentalities, a master sheet on said roller for selectively controlling the operation of said movable means, means for rendering said master sheet ineffective to control said movable means, and key controlled means for controlling the operation of said movable means when the master sheet is ineffective.

12. In a power driven typewriting machine, the combination of a power driven roller, printing instrumentalities, star wheels movable into and out of operative engagement with said power driven roller for actuating said printing instrumentalities, a master sheet on said roller for selectively controlling the movement of said star wheels into engagement with said roller, means for rendering the master sheet ineffective, and key controlled means for moving said star wheels into engagement with said roller when the master sheet is ineffective.

13. In a power driven typewriting machine, the combination of a power driven roller, printing instrumentalities, means movable into engagement with said power driven roller for actuating said printing instrumentalities, a master sheet on said roller for controlling the movement of said means into engagement therewith, means controlled by said master sheet for rendering it ineffective, and key controlled means for moving said first mentioned means into engagement with said power driven roller when the master sheet is ineffective.

14. In a power driven typewriting machine, the combination of a power driven roller, printing instrumentalities, a plurality of independently operable actuators movable into engagement with said power driven roller for actuating said printing instrumentalities, a master sheet on said roller for selectively controlling the movement of said actuators into engagement therewith, resilient means for pressing said actuators into engagement with the master sheet, means for feeding the master sheet, and means controlled by the master sheet for rendering said resilient means ineffective.

15. In a power driven typewriting machine, the combination of a power driven roller, printing instrumentalities, a plurality of independently operable actuators movable into engagement with said power driven roller for actuating said printing instrumentalities, a master sheet on said roller for selectively controlling the movement of said actuators into engagement therewith, resilient means for pressing said actuators into engagement with the master sheet, means for feeding the master sheet, means controlled by the master sheet for rendering said resilient means ineffective, and means for rendering said feeding means ineffective when said resilient means is ineffective.

16. In a power driven typewriting machine, the combination of a power driven roller, printing instrumentalities, a plurality of independently operable actuators movable into engagement with said power driven roller for actuating said printing instrumentalities, a master sheet on said roller for selectively controlling the movement of said actuators into engagement therewith, resilient means for pressing said actuators into engagement with the master sheet, means for feeding the master sheet, and two actuators controlled by said master sheet and arranged one in advance of the other, one for rendering said resilient means ineffective and the other for rendering said sheet feeding means ineffective.

17. In a power driven typewriting machine, the combination of a power driven roller, printing instrumentalities, a plurality of independently operable actuators movable into engagement with said power driven roller for actuating said printing instrumentalities, a slotted master sheet on said roller for selectively controlling the movement of said actuators into engagement therewith, means for feeding the master sheet, means controlled by the master sheet for rendering its feeding means ineffective when its slots register with said actuators, and key controlled means for selectively moving the actuators into engagement with said roller when the sheet feeding means is ineffective.

18. In a power driven typewriting machine, the combination of a power driven roller, printing instrumentalities, a plurality of independently operable actuators movable into engagement with said power driven roller for actuating said printing instrumentalities, a master sheet on said roller for selectively controlling the movement of said actuators into engagement therewith, means for feeding the master sheet, means for rendering said feeding means ineffective, and means controlled by the master sheet for rendering it ineffective to control the movement of the actuator.

19. In a power driven typewriting machine, the combination of a power driven roller, printing instrumentalities, a plurality of independently operable actuators movable into engagement with said power driven roller for actuating said printing instrumentalities, a master sheet on said roller for selectively controlling the movement of said actuators into engagement therewith, means for feeding the master sheet, means controlled by the master sheet for rendering it ineffective to control the movement of said actuators, means controlled by the master sheet for rendering its feeding means ineffective, manual means for again rendering the sheet feeding means operative, and means for rendering the master sheet effective to control the actuators when its feeding means is rendered effective.

20. In a power driven typewriting machine, the combination of a power driven roller, printing instrumentalities, a plurality of independently operable actuators movable into engagement with said power driven roller for actuating said printing instrumentalities, a perforated master sheet on said roller for selectively controlling the movement of said actuators into engagement therewith, means for feeding the master sheet, and three star wheels arranged to successively engage the same perforation in the master sheet to be successively operated thereby, the first to render the master sheet ineffective to control said actuators, the second to render the sheet feeding means ineffective, and the third to render the master sheet effective to control the master sheet.

21. In a power driven typewriting machine, the combination of a power driven roller, printing instrumentalities, means cooperating with said power driven roller for actuating said printing instrumentalities, a master sheet on said roller for controlling the operation of said printing instrumentalities, means for feeding said sheet, means controlled by said master sheet for rendering it ineffective to control the operation of said printing instrumentalities, other means controlled by said master sheet for rendering its feeding means ineffective, key levers for controlling the operation of the printing instrumentalities, locking means arranged to engage said key levers to render them inoperable, and means for rendering said locking means ineffective when the sheet feeding means is rendered ineffective.

22. In a power driven typewriting machine, the combination of a power driven roller, printing instrumentalities, means cooperating with said power driven roller for actuating said printing instrumentalities, a master sheet on said roller for controlling the operation of said printing instrumentalities, means for feeding said sheet, means controlled by said master sheet for rendering it ineffective to control the operation of said printing instrumentalities, other means controlled by said master sheet for rendering its feeding means ineffective, key levers for controlling the operation of the printing instrumentalities, a locking bar arranged in the paths of said key levers to render them inoperable but movable to an ineffective position, and means operatively connecting said locking bar with said sheet feeding means for moving the locking bar to ineffective position when the sheet feeding means is rendered ineffective and for moving the locking bar to effective position when the sheet feeding means is rendered effective.

In witness whereof, we have hereunto signed our names.

RUSSELL G. THOMPSON.
CHESTER W. CRUMRINE.